US007037531B2

(12) United States Patent
King et al.

(10) Patent No.: US 7,037,531 B2
(45) Date of Patent: *May 2, 2006

(54) ENERGY BAR

(75) Inventors: Roderick Frederick Gerardus Joseph King, West Yorkshire (GB); Richard William Gale, North Yorkshire (GB); Simon Edmund George Lester, London (GB)

(73) Assignee: Galactogen Products Limited, London (GB)

( * ) Notice: Subject to any disclaimer, the term of this patent is extended or adjusted under 35 U.S.C. 154(b) by 13 days.

This patent is subject to a terminal disclaimer.

(21) Appl. No.: 10/379,160

(22) Filed: Mar. 3, 2003

(65) Prior Publication Data

US 2003/0147939 A1  Aug. 7, 2003

Related U.S. Application Data

(63) Continuation of application No. 09/692,516, filed on Oct. 18, 2000, now Pat. No. 6,585,999.

(51) Int. Cl.
*A61K 35/78* (2006.01)
*C07H 1/00* (2006.01)

(52) U.S. Cl. .................................. 424/725; 536/1.11
(58) Field of Classification Search ................ 424/479; 524/58; 426/615, 658, 660
See application file for complete search history.

(56) References Cited

U.S. PATENT DOCUMENTS

| 1,467,182 A * | 9/1923 | McCann ...................... 409/345 |
| 1,695,445 A * | 12/1928 | Weiss .......................... 426/658 |
| 3,753,725 A * | 8/1973 | Williams et al. .............. 426/34 |
| 4,341,803 A * | 7/1982 | Koshida et al. ............. 426/242 |
| 5,032,411 A | 7/1991 | Stray-Gundersen |
| 5,401,524 A | 3/1995 | Burkes et al. |
| 5,487,894 A * | 1/1996 | Kovacs ........................ 424/750 |
| 5,587,190 A | 12/1996 | Guezennec et al. |
| 5,612,074 A | 3/1997 | Leach |
| 5,726,146 A * | 3/1998 | Almada et al. ................ 514/2 |
| 5,780,094 A | 7/1998 | King |
| 5,843,921 A | 12/1998 | Kaufman |
| 6,787,177 B1 * | 9/2004 | Crandall et al. ............ 426/615 |
| 2003/0082287 A1 * | 5/2003 | Wolt et al. ................... 426/549 |

FOREIGN PATENT DOCUMENTS

| EP | 0 184 121 B2 | 6/1986 |
| EP | 0 223 540 B1 | 5/1987 |
| EP | 0340491 | 4/1989 |
| EP | 0 340 491 A1 | 11/1989 |
| EP | 0 349 712 A1 | 1/1990 |
| EP | 0745333 A1 | 12/1996 |
| WO | WO 90/02494 | 3/1990 |
| WO | WO9608979 A1 | 3/1996 |
| WO | WO 96/18313 | 6/1996 |
| WO | WO97/49304 | 12/1997 |
| WO | WO98/06418 | 2/1998 |
| WO | WO98/53704 | 12/1998 |

OTHER PUBLICATIONS

Caesar, L. It's Time to Bake Bowser's Biscuits: Time to Bake Biscuits for Your Little Bowser; The Press-Enterprise, Riverside, CA, Dec. 10, 1999, pp. 1-4.*
Margen et al. Following the Thread of Fiber's Story; Chicago Sun Times, Chicago, Ill., Jun. 23, 1999, p. 4, pp. 1-3 provided of print-out from ProQuest Direct database.*
Chen et al. Reduction in Oocyte Number Following Prenatal Exposure to a Diet High in Galactose; Science (1981) Dec. 4;214 (4525): pp. 1145-1147.*
Gropper et al. Free Galactose Content of Fresh Fruits and Strained Fruit and Vegetable Baby Foods: More Foods to Consider for the Galactose-Restricted Diet; Journal of the American Dietetic Association, May 2000, 100, pp. 573-575.*
Mizisin et al. NT-3 Attenuates Functional and Structural Disorders in Sensory Nerves of Galactose-Fed Rats; Journal of Neuropathology and Exper. Neurology, Sep. 1998, vol. 57, Issue 9, p. 803, 11 pages, pp. 1-9 of ProQuest Direct print-out.*
Oshodi et al. Chemical Composition, Nutritionally Valuable Minerals and Functional Properties of Benniseed (Sesamum Radiatum . . . ; Food Sci. and Nutr. Sep. 1999, vol. 50, Issue 5, p. 325, 7 pages, pp. 1-7 of ProQuest Direct print-out.*
Peyrebrune et al., The effects of oral creatine supplementation on performance in single and repeated sprint swimming, 1998, Journal of Sports Sciences, pp. 271-279.
Subject Matter Search Report dated Nov. 30, 2000, 14 pages.
Koivisto, VA et al., "Carbohydrate ingestion before exercise: comparison of glucose, fructose and sweet placebo". J. Appl. Physiol. 51(4): pp. 783-787, 1981.
Koivisto, VA et al., "Glycogen depletion during prolonged exercise: influence of glucose, fructose or placebo". J. Appl. Physiol. 58(3): pp. 731-737, 1985.
Barth, et al, "Oral intake of glucose plus galactose and erythrocyte galactose-1-phosphate, A nutritional evaluation of hydrolyzed lactose", Z Ernahrugswiss 25:171-179 (1986).
Williams, CA et al., "The influence of glucose on serum galactose levels in man". Metabolism 1983; 32:250-256.

(Continued)

Primary Examiner—Patricia Leith
(74) Attorney, Agent, or Firm—Beyer Weaver & Thomas LLP

(57) ABSTRACT

An energy multi-saccharide food product including:
  a saccharide component including 5 to 20% w/w galactose;
  to 25% w/w creatine; and
  optional further ingredients selected from: carbohydrate, fibre and fat.

18 Claims, No Drawings

OTHER PUBLICATIONS

Fried, R. et al., "Early glycogenolysis and late glycogenesis in human liver after intravenous administration of galactose". Am J Physiol 270(1):G14-19;1996.

Samols, E. et al., "Insulin response to fructose and galactose". The Lancet. 1:478-479, 1963.

Ganda, OP et al., "Metabolic effects of glucose, mannose, galactose, and fructose in man". J Clin Endocrinol Metab 1979; 49: 616-621.

Adopo, E. et al., "Respective oxidation of exogenous glucose and fructose given in the same drink during exercise". J Appl Physiol 1994; 76: 1014-1019.

Green, AL et al., "Carbohydrate ingestion augments skeletal muscle creatine accumulation during creatine supplementation in man". Am J Physiol 1996; 271: E812-826.

Green, AL et al., "Carbohydrate ingestion augments creatine retention during creatine feeding in man". Acta Physiol Scan 1996; 158:195-202.

Vanden berghe, K. et al., "Long term creatine is beneficial to muscle performance during resistance training". J Appl Physiol 1997; 83: 2055-2063.

Volek, JS et al., "Performance and muscle fiber adaptations to creatine supplementation and heavy resistance training". Med Sci Sports Exerc 1999; 31: 1147-1157.

Balsom, PD et al., "Creatine supplementation and dynamic intensity intermittent exercise". Scand J Med Sci Sports 1993; :I: 143-149.

Haughland, RB et al., "Insulin effect on creatine transport in skeletal muscle". Proc Soc Expt Biol and Med 1975; 148: 1-4.

Green, AL et al., "Creatine ingestion augments muscle creatine uptake and glycogen synthesis during carbohydrate feeding in man". J Physiol 1996; 491:63-64P.

Fitch, CD et al., "Creatine metabolism in skeletal muscle". J Biol Chem 1968; 243:2024-2027.

Koszalska, TR et al., "Effect of insulin on creatinuria and hypercreatinemia induced by creatine loading". Proc Soc Exp Biol Med. 1970; 135: 905-910.

Koszalska, TR et al., "Effect of insulin on the uptake of creative-1-'4C by skeletal muscle in normal and X-irradiated rats and hypercreatinemia induced by creatine loading". Proc Soc Exp Biol Med. 1972; 139: 1265-1271.

Cohn, et al., "Galactose Metabolism and It's Regulation", Process in Endocrinology and Metabolism, vol. 22, No. 4 (Apr.), 1973.

Rommel, et al. "Einfluβ der Galaktose auf die Insulinserkretion beim Menschen", Diabetologia 5, 309-311 (1969).

Royle, et al, "The metabolic response to galactose as a measure of hepatic glucose release in man", Clinical Science and Molecular Medicine (1978) 54, 107-109.

Pukrittayakamee, et al., "Hepatic blood flow and metabolism in severe falciparum malaria: clearance of intravenously administered galactose", Clinical Science (1992) 52, 63, 70.

Birlouez-Aragon, et al., "Effect of Prolonged Galactose Consumption on Galactose Tolerance in Young Healthy Humans", Ann Nutr Metab 1990; 34:1-7.

William, Celia A., "Metabolism of Lactose and Galactose in Man", Prog. Biochem. Pharmacol., vol. 21, pp. 219-247 (Karger, Basel 1986).

Eaton, et al., "Comparison of the Energy Cost of Treadmill Exercise in Horses and Ponies", Proc. Nutr. Soc. Aust (1991) 16, pp. 26-27.

Morgan, et al., "The Effect of Oral Galactose on GIP and Insulin Secretion in Man", Diabetologia 16, 235239 (1979).

Ambrus, et al., "Effect of Galactose and Sugar Substitutes on Blood Insulin Levels in Normal and Obese Individuals", Journal of Medicine, vol. 7, No. 6, 1976, pp. 429-439.

Williams et al, "Metabolic Effects of Dietary Galactose", Wld Rev. Nutr. Diet., vol. 39, pp. 23-52 (Karger, Basel 1982).

Manso, et al., "Effects of Galactose, Glucose and Fructose on Carbohydrate-Lipid Metabolism", Journal of Medicine, vol. 10, No. 6, 1979, pp. 479-487.

Elia, et al., "Changes in blood glucose and plasma insulin after intravenous galactose in human injury", Clinical Science (1979) 57, 249-256.

Williams, Celia A., "Influence of Glucose, Alcohol and Glycerol on Galactose Tolerance in Man", Ann. Nutr. Metab. 31: 320-326 (1987).

Ercan, et al., "Effects of Glucose, Galactose, and Lactose Ingestion on the Plasma Glucose and Insulin Response in Persons With Non-Insulin-Dependent Diabetes Mellitus", Metabolism, vol. 42, No. 12 (Dec.), 1993: pp. 1560-1567.

Leigh, Lanes, "Insulin Response to Fructose and Galactose", Mar. 2, 1963, pp. 478-479.

Roe, et al., "Galactose Tolerance of Normal and Diabetic Subjects, and the effect of insulin upon galactose metabolism", J. Biol Chem. 96 (1932).

King, RFGJ, Cooke CB, O'Hara J (2001) "The use of Galactose in Sports Drinks before Exercise." FASEB 15 (4) A990 Abstract.

King, RFGJ, Cooke CB, O'Hara J (2001) "The Effects of Galactose and Glucose Based Sports Drinks in Blood Glucose Concentrations." Can J. Physiol, 2b; S261. Abstract.

King RFGJ, Cooke CB, O'Hara J (2001) "The Effects of Galactose and Glucose Based Sports Drinks in Endurance Performance." Can J Physiol; S261-262. Abstract.

New Zealand Search Report for application No. 529659, citing 0340491.

* cited by examiner

ENERGY BAR

"This is a Continuation application of prior application Ser. No. 09/692,516, filed Oct. 18, 2000 now U.S. Pat. No. 6,585,999, which claims priority of United Kingdom Application No.: 9924650.6, filed Oct. 19, 1999, filed on which designated the United States, the disclosures of which are incorporated herein by reference."

This invention relates to high energy multi-saccharide food products containing the substance galactose, which find use as an ergogenic aid, particularly but not exclusively for persons participating in sports or other forms of exercise. The products of this invention also find use in cases of hunger or fatigue in the general population.

Exercise makes excessive demands on substrates both within and external to the muscle. Carbohydrates are especially important as precursors of glycogen both in liver and muscle and as an energy source which can be used immediately. Accordingly there is a need for a short term energy supply during anaerobic and aerobic conditions. It is also a requirement for carbohydrates which serve as precursors either directly or indirectly for synthesis of glycogen in liver and muscle. Muscle cannot function efficiently or at a high level of power output if reserves of glycogen are low or sub-optimal. Depletion of glycogen in athletes results in poor performance and poor efficiency. Use of specific carbohydrates as an ergogenic aid has been proved to increase or maintain the stores of glycogen and availability of blood glucose.

The food products of this invention may comprise chewable or edible bars, sweets, cookies, biscuits, lozenges or chewing gum. Chewable or edible bars are preferred.

According to the present invention a high energy multi-saccharide food product comprises a saccharide component including 3 to 37% w/w galactose, 0 to 25% w/w of creatine and optional further ingredients selected from carbohydrate; fibre and fat.

Amounts and percentages in this specification are by weight unless indicated otherwise and are selected to total 100%.

The amount of galactose is preferably 5 to 20%, more preferably 5 to 15%.

The saccharide component also includes glucose. In a first preferred embodiment equal amounts of glucose and galactose are provided. In a second preferred embodiment the amount of galactose is greater than the amount of glucose.

Use of galactose affords several advantages. It is not insulogenic, that is it does not itself induce an insulin response, hence its use is associated with less of an insulin response than the equivalent mass of glucose. Products in accordance with this invention may be used by diabetics or persons who ae intolerant to lactose. Galactose can be used rapidly by the liver for synthesis of glycogen or glucose. It is less likely to cause dental erosion than other sugars.

Use of creatine is optional. Preferred embodiments of the invention incorporate 10 to 25% creatine. The use of creatine is preferably such that the conversion to creatinine is inhibited. This conversion is a natural equilibrium. Creatinine is rapidly excreted by-the kidneys. In order to minimise or prevent conversion to creatinine it is preferred that the creatine is encapsulated as granules or powder in a dry water-impervious shell. Micro-encapsulation is preferred. In this way the creatine is released in the stomach by dissolution. Alternatively the creatine may be isolated from the moist part of an edible bar by formulation in layers alternatively or in addition to encapsulation. For example the creatine may be contained in a separate layer of the food bar or lozenge.

Food products in accordance with this invention are useful in general cases of creatine depletion, for example in vegetarians or individuals where build-up of muscle function is needed or is clinically advisable.

Exercise makes excessive demands on substrates both within and external to muscle. Creatine phosphate is derived from both dietary creatine and from endogenous synthesis. Creatine phosphate is essential for short term energy supply during anaerobic conditions and also for energy transfer from mitochondria to contractile muscle. Muscle cannot function efficiently or at a high level of power output if reserves of creatine are low or sub-optimal. Depletion of creatine in athletes causes poor performance and poor efficiency.

Galactose may be provided as a pure ingredient which is mixed with glucose, starch and other ingredients during manufacture. Alternatively a glucose-galactose syrup such as may be prepared by hydrolysis of lactose may be employed. The amount of galactose in such a syrup may be supplemented by additional pure galactose.

Use of fibre in the bar is advantageous because different fibre products influence the release of sugars, affect the binding of various components and advantageously delay digestion. An amount of 0 to 5% may be employed. Furthermore the galactose or galactose-glucose syrup may be absorbed onto the fibre prior to manufacture. In this way the absorption of galactose may be retarded.

In an alternative embodiment the food products may have an external coating containing galactose in order to facilitate rapid absorption of galactose.

Formulations having a higher concentration of galactose are preferred in order to enhance galactose up-take by the liver and rapid production of glycogen. Increased amounts of galactose decrease the amount of lipid manufactured from glucose. Galactose is not a direct fat precursor. This is advantageous as lipids do not afford a rapid energy source.

The invention is further described by means of example but not in any limitative sense.

The following Tables and Examples list the ingredients of compositions of food products in accordance with this invention. These products may be manufactured into bars, sweets or lozenges using conventional methods.

In a layered arrangement the creatine powder or aggregate may be covered with a hard dry sugar layer. Alternatively or in addition a chocolate containing layer may be used as a moisture barrier. The creatine containing layer may be provided as a larninar cylindrical layer disposed within the bar as the inner layer. In this way the creatine containing component may be encapsulated. Alternatively or in addition ingredients such as fibre, nuts and dried fruit may be layered onto the creatine to form a laminate. The fibre layer may incorporate syrup to form a composite layer.

The outermost layer of the bar or other food product may comprise a single thin layer of hard sugar for example composed of galactose or a mixture of galactose with glucose or sucrose. Such an arrangement of the sugar layer dissolves rapidly when portions of the bar pass into the stomach.

In alternative food products the creatine powder or aggregate may be covered with a hard sugar mixture, chocolate or both to form particles with a mass of 100 to 500 mg. These can be combined with the remaining ingredients to form dispersed units within the matrix, for example as chocolate chips within a cookie. Such an encapsulated arrangement may incorporate layers as previously described.

The following tables contain general ranges of preferred ingredients.

TABLE 1

| Ingredient | Range (% w/w) | Comments |
|---|---|---|
| Carbohydrate | 50–75 | Mono, di, oligosaccharides, syrup etc. |
| Fat | 0–10 | Saturated and unsaturated |
| Fibre | 0–10 | |
| Creatine | 0–25 | As monohydrate |
| Protein | 0–15 | |
| Vitamins | 50–100% of RDA | Full range |
| Galactose | 5–20 | |

TABLE 1-continued

| Ingredient | Range (% w/w) | Comments |
|---|---|---|
| Dried Fruit | 0–15 | |
| Seeds and Nuts | 0–15 | |
| Glucose | 0–10 | |
| Flavours | As necessary | |
| Stabilisers | 1–3 | |
| Water | 0–30 | |

TABLE 2

| | Example 1 | Example 2 | Example 3 | Example 4 | Example 5 | Example 6 |
|---|---|---|---|---|---|---|
| Cornstarch | 20 g | 10 g | 20 g | 10 g | 10 g | 8 g |
| Maltodextrin | 20 g | 10 g | 20 g | 10 g | 10 g | 8 g |
| Raw cane sugar | 2 g | 2 g | 2 g | 2 g | 2 g | 2 g |
| Fructose | 3 g | 3 g | 3 g | 3 g | 3 g | — |
| Refined cane sugar | 5 g | 5 g | 5 g | 5 g | 5 g | — |
| Glucose | 5 g | 5 g | — | — | 5 g | 5 g |
| Galactose | 5 g | 5 g | — | — | 5 g | 5 g |
| Glucose/Galactose syrup | — | — | 10 g | 10 g | — | — |
| Fat | 10 g | 10 g | 10 g | 10 g | 10 g | 5 g |
| Fibre | 5 g | 5 g | 5 g | 5 g | 5 g | 5 g |
| Creatine | — | 20 g | — | 20 g | — | 20 g |
| Vitamins | 1 g | 1 g | 1 g | 1 g | 1 g | 1 g |
| Protein | 10 g | 10 g | 10 g | 10 g | 10 g | 7 g |
| Flavours | 1 g | 1 g | 1 g | 1 g | 1 g | 1 g |
| Stabilisers | 2 g | 2 g | 2 g | 2 g | 2 g | 2 g |
| Water | 11 g | 11 g | 11 g | 11 g | 11 g | 11 g |
| Fruit | — | — | — | — | 10 g | 10 g |
| Seeds and Nuts | — | — | — | — | 10 g | 10 g |

| | Example 7 | Example 8 | Example 9 | Example 10 | Example 11 | Example 12 |
|---|---|---|---|---|---|---|
| Cornstarch | 20 g | 10 g | 20 g | 10 g | 10 g | 8 g |
| Maltodextrin | 20 g | 10 g | 20 g | 10 g | 10 g | 8 g |
| Raw cane sugar | 2 g | 2 g | 2 g | 2 g | 2 g | 2 g |
| Fructose | 3 g | 3 g | 3 g | 3 g | 3 g | — |
| Refined cane sugar | 5 g | 5 g | 5 g | 5 g | 5 g | — |
| Glucose | 5 g | 5 g | — | — | 5 g | 5 g |
| Galactose | 5 g | 5 g | — | — | 5 g | 5 g |
| Glucose/Galactose syrup | — | — | 10 g | 10 g | — | — |
| Fat | 10 g | 10 g | 10 g | 10 g | 10 g | 5 g |
| Fibre | 5 g | 5 g | 5 g | 5 g | 5 g | 5 g |
| Creatine | — | 20 g | — | 20 g | — | 20 g |
| Vitamins | 1 g | 1 g | 1 g | 1 g | 1 g | 1 g |
| Protein | 10 g | 10 g | 10 g | 10 g | 10 g | 7 g |
| Flavours | 1 g | 1 g | 1 g | 1 g | 1 g | 1 g |
| Stabilisers | 2 g | 2 g | 2 g | 2 g | 2 g | 2 g |
| Water | 5 g | 5 g | 5 g | 5 g | 5 g | 5 g |
| Fruit | 3 g | 3 g | 3 g | 3 g | 13 g | 13 g |
| Seeds and Nuts | 3 g | 3 g | 3 g | 3 g | 13 g | 13 g |

| | Example 13 | Example 14 | Example 15 | Example 16 | Example 17 | Example 18 |
|---|---|---|---|---|---|---|
| Cornstarch | 15 g | 5 g | 15 g | 5 g | 5 g | 8 g |
| Maltodextrin | 15 g | 5 g | 15 g | 5 g | 5 g | 8 g |
| Raw cane sugar | 2 g | 2 g | 2 g | 2 g | 2 g | 2 g |
| Fructose | 3 g | 3 g | 3 g | 3 g | 3 g | — |
| Refined cane sugar | 5 g | 5 g | 5 g | 5 g | 5 g | — |
| Glucose | 5 g | 5 g | — | — | 5 g | 5 g |
| Galactose | 5 g | 5 g | — | — | 5 g | 5 g |
| Glucose/Galactose syrup | — | — | 10 g | 10 g | — | — |

TABLE 2-continued

| | | | | | | |
|---|---|---|---|---|---|---|
| Fat | 10 g | 10 g | 10 g | 10 g | 18 g | 3 g |
| Fibre | 5 g | 5 g | 5 g | 5 g | 2 g | 2 g |
| Creatine | — | 20 g | — | 20 g | — | 20 g |
| Vitamins | 1 g | 1 g | 1 g | 1 g | 1 g | 1 g |
| Protein | 5 g | 5 g | 5 g | 5 g | 5 g | 2 g |
| Flavours | 1 g | 1 g | 1 g | 1 g | 1 g | 1 g |
| Stabilisers | 2 g | 2 g | 2 g | 2 g | 2 g | 2 g |
| Water | 20 g | 20 g | 20 g | 20 g | 20 g | 20 g |
| Fruit | 3 g | 3 g | 3 g | 3 g | 13 g | 13 g |
| Seeds and Nuts | 3 g | 3 g | 3 g | 3 g | 8 g | 8 g |

What is claimed is:

1. An energy multi-saccharide food product, comprising: no more than 15% by total weight dried fruit; a saccharide component comprising 3 to 37% by total weight free galactose monosaccharide; and 5 to 10% by total weight fiber.

2. The food product of claim 1, further comprising up to 25% by total weight creatine.

3. The food product of claim 2, wherein the amount of creatine is 10 to 25%.

4. The food product of claim 3, wherein the creatine is encapsulated as granules or powder.

5. The food product of claim 4, wherein the creatine is microencapsulated.

6. The food product of claim 3, wherein the creatine is contained in a layer separate from other ingredients of the food product.

7. The food product of claim 1, wherein the amount of galactose is 5 to 20%.

8. The food product of claim 1, wherein the saccharide component comprises glucose.

9. The food product of claim 8, wherein the saccharide component comprises equal amounts of galactose and glucose.

10. The food product of claim 8, wherein the amount of galactose is greater than the amount of glucose.

11. The food product of claim 1, having an outermost layer of hard sugar comprising galactose or a mixture of galactose and sucrose.

12. A food product as claimed in claim 1, wherein the saccharide component comprises fructose.

13. A food product as claimed in claim 1, wherein the saccharide component comprises maltodextrin.

14. A food product as claimed in claim 1, wherein the saccharide component comprises maltodextrin and fructose.

15. A method for replenishing glycogen reserves in a subject, the method comprising:
administering to the subject the food product of claim 1.

16. The method of claim 15, wherein the replenished glycogen reserves are in liver.

17. The method of claim 15, wherein the replenished glycogen reserves are in muscle.

18. The method of claim 15, wherein the food product is orally administered.

* * * * *

UNITED STATES PATENT AND TRADEMARK OFFICE
CERTIFICATE OF CORRECTION

PATENT NO. : 7,037,531 B2 Page 1 of 1
APPLICATION NO. : 10/379160
DATED : May 2, 2006
INVENTOR(S) : King et al.

It is certified that error appears in the above-identified patent and that said Letters Patent is hereby corrected as shown below:

Column 2, line 47, change "larninar" to --laminar--.

In line 2 of claim 13 (column 6, line 23) change "saccbaride" to --saccharide--.

Signed and Sealed this

Twenty-eighth Day of November, 2006

JON W. DUDAS
*Director of the United States Patent and Trademark Office*